United States Patent
Wheeler et al.

(10) Patent No.: US 6,639,973 B1
(45) Date of Patent: Oct. 28, 2003

(54) MOBILE ORIGINATOR CALL CONTROL

(75) Inventors: Jill C. Wheeler, Gilbert, AZ (US); Peter J. Armbruster, Chandler, AZ (US); Bradley R. Schaefer, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/133,870

(22) Filed: Apr. 26, 2002

(51) Int. Cl.[7] .................. H04M 1/64; H04M 3/42; G06F 13/38
(52) U.S. Cl. ............... 379/88.18; 379/67.1; 379/79; 379/88.13; 379/88.17; 379/88.18; 379/207.07; 379/207.08; 379/209.01; 379/210.02
(58) Field of Search ................. 379/67.1, 68, 79, 379/88.04, 88.13, 88.17, 88.18, 88.22, 88.25, 900, 901, 908, 142.02, 207.07, 207.08, 209.01, 210.02; 709/227, 228, 204, 205, 217, 218, 235

(56) References Cited

U.S. PATENT DOCUMENTS

| | | | | |
|---|---|---|---|---|
| 4,972,461 | A | * 11/1990 | Brown et al. | 379/67 |
| 5,497,414 | A | * 3/1996 | Bartholomew | 379/142 |
| 6,446,118 | B1 | * 9/2002 | Gottlieb | 709/217 |
| 2001/0003202 | A1 | * 6/2001 | Mache et al. | 713/153 |
| 2001/0025280 | A1 | * 9/2001 | Mandato et al. | 707/3 |
| 2001/0049745 | A1 | * 12/2001 | Schoeffler | 709/238 |
| 2002/0120697 | A1 | * 8/2002 | Generous et al. | 709/206 |
| 2002/0160757 | A1 | * 10/2002 | Shavit et al. | 455/414 |

* cited by examiner

Primary Examiner—Allan Hoosain
(74) Attorney, Agent, or Firm—Frank L. Rogacz

(57) ABSTRACT

An originating party (10) places a call through an originating party called control (30), through a network (40), through a terminating party call control (50) to a terminating subscriber (22). For an inability to complete the connection from the originating subscriber to the terminating subscriber, control is returned from the terminating party call control through network (40) to the call control logic (31) of the originating party call control (30) or directly to the originating subscriber (10).

8 Claims, 4 Drawing Sheets

MOBILE ORIGINATOR CALL CONTROL

BACKGROUND OF THE INVENTION

The present invention pertains to communication system, services and more particularly to control of a call by an originating party.

Communication networks, whether wireless or wireline, typically provide the terminating party of a call with special call handling features. These special service features include call forwarding, call waiting, call hold, and anonymous call rejection, for example. These services are controlled and applied by the terminating party of a call.

The terminating party can arrange to have his calls forwarded to a voicemail for example. The terminating party may play a prerecorded message. However, each of the services provided by the terminating party are controlled exclusively by the terminating party. All the present features for call control are provided to the selection of the terminating party.

Most calls are originated by a mobile originating party in a mobile network. Therefore, providing the terminating party with call control in mobile networks seems counter productive of providing the best service. Accordingly, in a mobile network it would be highly desirable to provide service logic execution which may be triggered by an originating party for various supplementary services such as under conditions in which the terminating party is not reachable.

DESCRIPTION OF THE PREFERRED EMBODIMENTS

Figure 1:
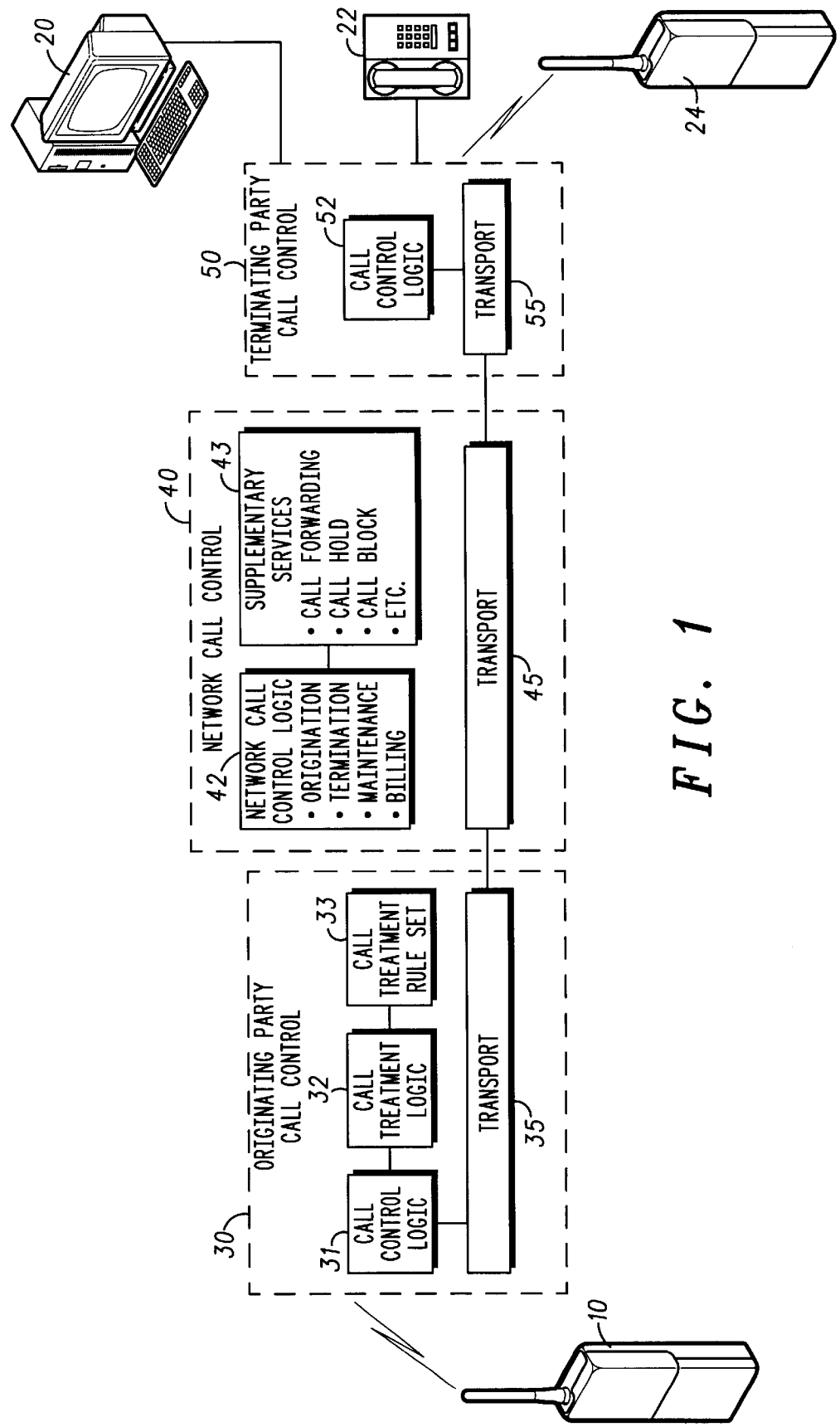
FIG. 1 is a block diagram of an arrangement for originating party call control in accordance with the present invention.

Referring to FIG. 1, a block diagram of the network configuration for providing an embodiment of the present invention is shown. Originating party 10 is shown as being coupled by an RF link 11 to the originating party call control 30. Terminating parties include computer 20, wireline subscriber 22 and mobile subscriber 24. Terminating parties 20–24 are possible connections which may be sought by originating party 10. Terminating parties 20–24 are all connected to the terminating party subscriber control logic 50. Originating and terminating party call control 30 and 50 are coupled via network 40.

Typically call control is exercised by the network or the terminating party. Examples of network call control are call forward, call hold, voicemail. Examples of terminator call control are distinctive ring based on calling party number Typically when an originating party connects or attempts to connect to a terminating party and the terminating party is unavailable, network call control 42 or the terminating party subscriber control logic 50 controls what happens to the attempted connection.

In a preferred embodiment of the present invention, originating party 10 may set service logic preferences within the call treatment rule set 33 of the originating party subscriber control logic. These settings of call treatment rule sets would include what action to take should a particular terminating party 20–24 be unavailable. In an alternate embodiment, the call treatment rule set may also be stored within the subscriber calling equipment 10.

When the originating call control logic 31 of the originating party call control 30, detects a lack of connection to a terminating party 20–24, call control logic 31 transfers to call treatment logic 32. Transport 35 connects originating party 10 through the transport 45 of network 40, through the transport 55 of terminating party subscriber control logic 50 to attempt to connect to computer 20, for example. Transports 35, 45 and 55 provide the necessary radio link protocol for wireless networks or the appropriate physical ports for wire line LANs (local area networks). Originating party call control 30 and call control logic 31 have transmitted an indication to call control logic 42 and supplementary services 43 of network 40 that should the terminating party, computer 20, be unavailable, control is to be returned to call control logic 31 instead of typically being processed by call control logic 52 or computer 20, for example.

When the targeted terminating party, computer 20 for example, cannot be reached, terminating call control logic 52 returns control through transports 55, 45 and 35 to originating call control logic 31. Call control logic 31 then passes control to call treatment logic 32 and subsequently the originating party 10 treatment rule set 33 is activated.

A key to this call processing is to give the originating party 10 control when the attempt to connect to the terminating party fails. That is, the terminating party's subscriber services such as call forwarding or voicemail, etc., will be preempted and control returned to the originating party to determine the action to take for failure of connection.

For example, in a situation where the terminating party, computer 20, is not available, the originating party 10 through call treatment rule set 33 may establish a set of preferences such as:

TABLE 1

| | |
|---|---|
| 1) | initiate autodialing from a prestored list of phone numbers or IP addresses; |
| 2) | send a prestored message to a prestored address (phone number, IP address, alpha-numeric pager, etc.); |
| 3) | send a voicemail message or instant message to one or more of the terminating parties 20 contact addresses; and |
| 4) | periodically redial the phone number or reinitiate the IP address from a prestored list of numbers or addresses. |

As can be seen from the above explanation, this invention places control of the call processing into the hands of the originating party instead of typically leaving it in the hands of the terminating party of the call. This provides the advantage of the originating party being able to take non-standard actions or alternatives based upon the originating party's circumstances.

Figure 2:
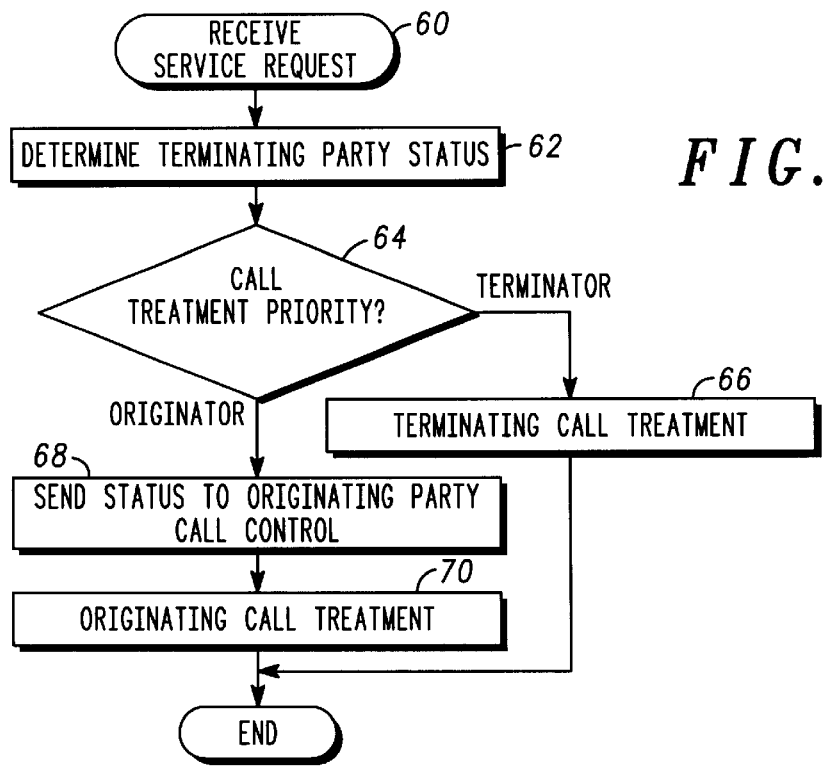
FIG. 2 is a flow chart of call processing network operation in accordance with the present invention.

Referring to FIG. 2, a flow chart of the call processing in accordance with the present invention is shown. The method shown in FIG. 2 is performed by network 40 for calls put through the network. First, the network receives a service request, block 60. This is a request for a call origination or termination from an originating party 10 through originating party call control 30 into the network 40. Next the network determines the terminating party status, block 62. That is, the network determines whether the terminating party or called party has its line busy; is blocked or is attempting to place the incoming call on hold; etc.

Next the network determines the call treatment priority associated with this call attempt, block 64. If the terminating party has the call treatment priority block 64 transfers control to block 66 via the terminator path. Block 66 will provide the terminating call treatment indication to originating party call control 30. For example, a busy tone will be returned to the originating party 10, since the terminating party's line was busy. As another example, the originating party's call may be call forwarded or placed on hold if the terminating party subscriber equipment indicated these service features were functional.

If the call treatment indicates that the originating party is to control for terminating party statuses like busy, blocked, hold, etc., block 64 transfers control to block 68 via the originator path. Block 68 sends the terminating party's 20 status to the originating party or to the originating party call control 30 depending on the preferred embodiment of the invention. That is, if the originating party call control 30 is performing the call treatment logic 32 then the request is sent to the originating party call control 30. In distinction, if the originating party 10 is performing the call treatment and rule set functions then the status such as busy, blocked, hold, etc. is sent back to the originating party 10. Lastly, block 70 indicates that either the originating party call control 30 or the originating party 10 handles the origination call treatment as will be demonstrated infra. The process is then ended.

Figure 3:
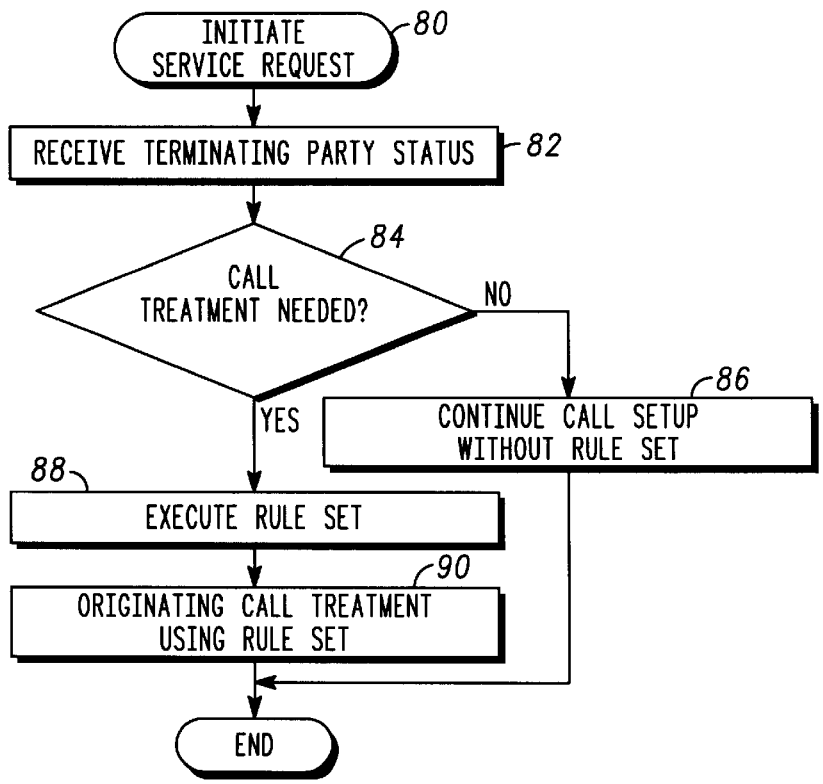
FIG. 3 is a flow chart for call control by the originating party in accordance with the present invention.

FIG. 3 depicts a flow chart of the call processing by the originating party call control 30 or by the originating party 10. Block 80 initiates a service request to the network 40 for call completion through terminating party subscriber control logic 50 to a terminating party, computer 20. If FIG. 2 has processed block 70, origination call treatment is entered. Block 82 is the beginning of the originating call treatment. Block 82 receives the terminating party status. The terminating party status indicates whether the terminating party was busy, blocked, on hold, etc.

Next, block 84 determines whether the originating call treatment is needed. If the treatment is not needed, block 84 transfers control to block 86. Block 86 continues the call without reference to the call treatment rule set which may have been stored in the originating party 10 or in the originating party call control 30. Block 86 then ends the process.

If the originating call treatment is required, block 84 transfers control to block 88 via the yes path. Block 88 invokes the prestored call treatment rule set. Block 88 will select a particular rule set to be followed for the specified return condition of the terminating party. For example, block 88 may choose to invoke Rule 1) of Table 1 above. That is, the originating party call control 30 may select phone numbers from a prestored list and begin autodialing from that list of numbers. Lastly, block 90 will perform the required originating call treatment. That is, it will actually autodial the appropriate phone number from the list which was prestored. See Table 1 above. Then the process is ended.

Figure 4:
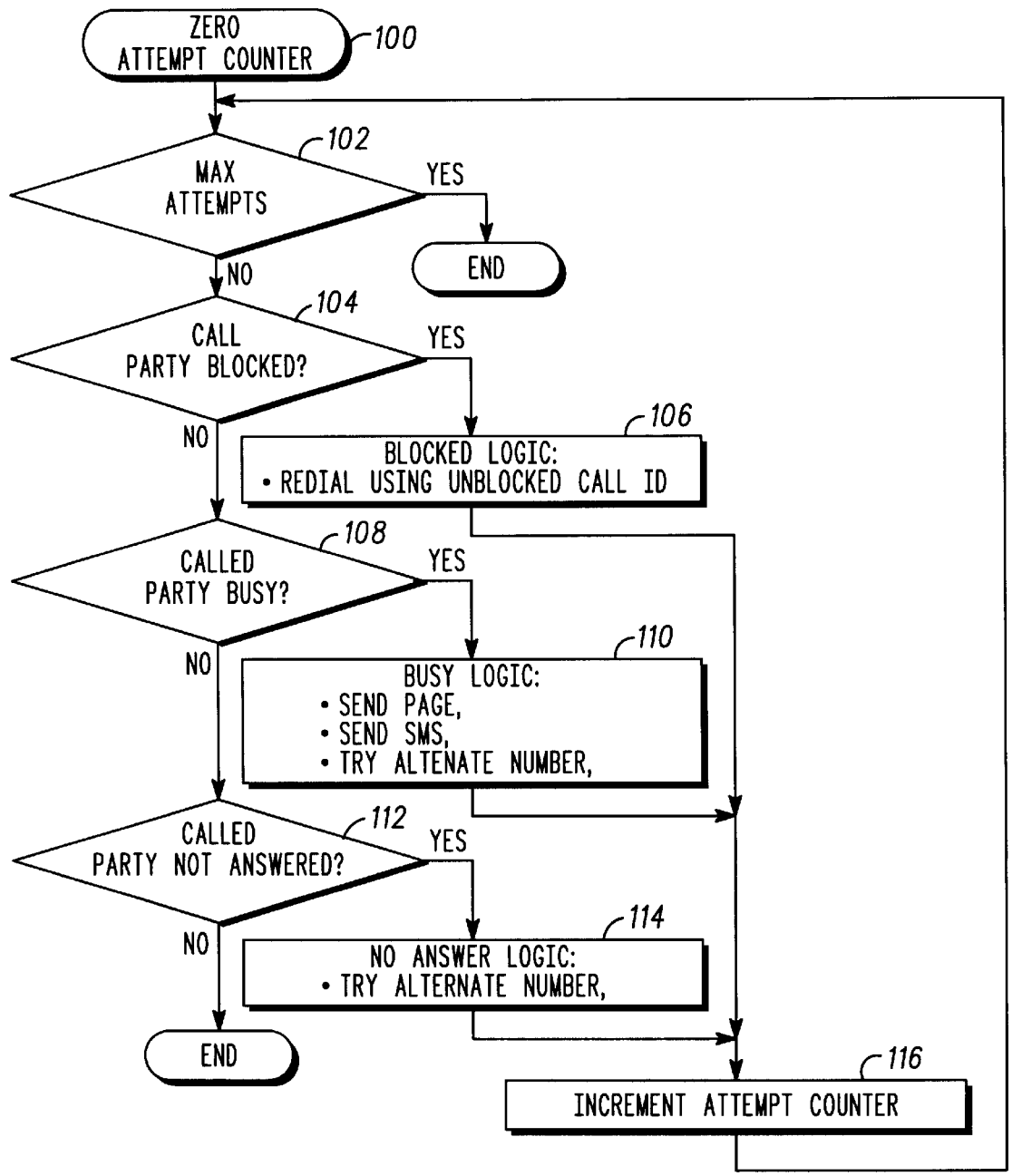
FIG. 4 is a flow chart of an example for a rule set implementation for a call control by the originating party in accordance with the present invention.

FIG. 4 depicts an example of a call treatment rule set for the originating party call control 30 or the originating party 10. First, an attempt counter is zeroed or cleared, block 100.

Block 102 determines whether a maximum number of attempts has been exceeded. If the maximum amount of allowable attempts has been exceeded, block 102 ends the process via the yes path. If the maximum number of attempts has not been exceeded, block 102 transfers control to block 104.

Block 104 determines whether the terminating party was blocked for network communication. If the terminating party was blocked, block 104 transfers control to block 106. Block 106 executes the blocked logic which may include redialing the number using an unblocked call identification. Block 106 then transfers control to block 116 which increments the attempt counter and transfers control to block 102. If the terminating party is not blocked, block 104 transfers control via the NO path to block 108. Block 108 determines whether the terminating party was busy. If the terminating party is busy, block 108 transfers control to block 110. Block 110 is the busy logic. For example, the busy logic may send a page to a particular number; send an SMS message; or try an alternate number, for example. When the busy logic 110 has performed the appropriate function, it transfers control to block 116. Again, block 116 increments the attempt counter and transfers control to block 102 to iterate the process.

If the terminating party was not busy, block 108 transfers control to block 112 via the NO path. Block 112 determines whether the terminating party answered. If the terminating party answered, block 112 terminates the process via the NO path. If the terminating party did not answer, block 112 transfers control to block 114, the no answer logic. Block 114 may try an alternate number or send a page, etc. When block 114 has finished the no answer logic, it transfers control to block 116. Block 116 increments the attempt counter and transfers control to block 102 to iterate the process.

Figure 5:
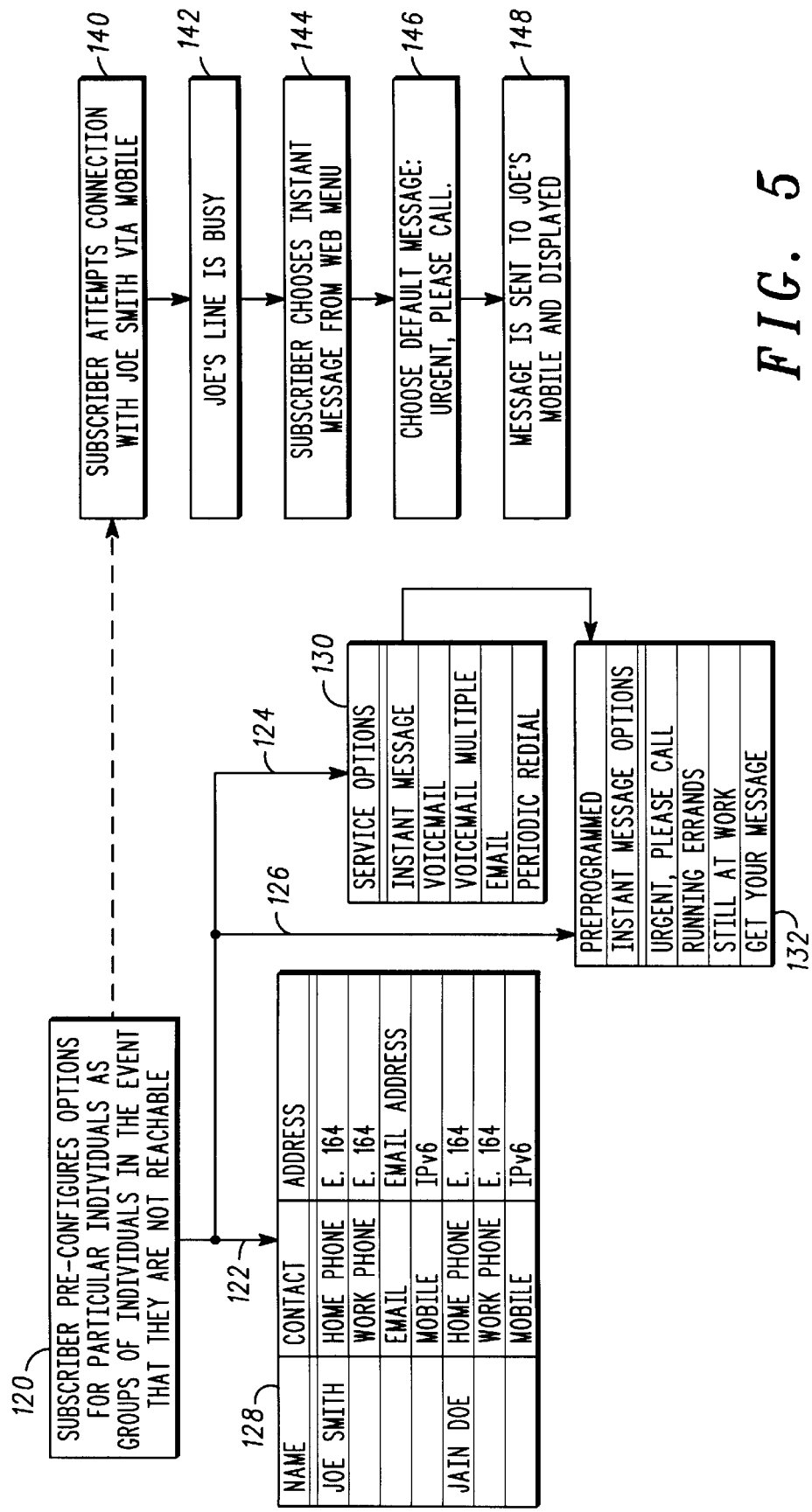
FIG. 5 is a block diagram of an example of originating party call control for a call forwarding example.

FIG. 5 is a block diagram depicting the execution of the call treatment rule set for a call forwarding example. The originating party must pre-configure options in the tables (128, 130, 132) of the call treatment rule set 33 within the call treatment rule set 33 for particular individuals or groups in the event that certain terminating parties are not reachable, block 120. The originating party attempts a connection with Joe Smith via a mobile phone, 140. Joe Smith's line is busy, block 142. The originating subscriber then has pre-selected an instant message from a web menu, block 144.

Call treatment rule set 33 selects Joe's mobile and the appropriate corresponding address, 122. The originating party has pre-selected for this situation a default message of "urgent, please call", block 146. Path 124 is selected and points to the service options 130. The service options 130 includes the instant message option and points to the list of instant messages, 132. The selected message is obtained from data storage. That is, the "urgent, please call" message is copied from the instant message options 132. Lastly, the message "urgent, please call" is sent to Joe's mobile phone via the IPv6 address and displayed on Joe's mobile phone, block 148.

As can be seen from the above examples, the present invention provides the originating party with a large number of option to invoke when the terminating party may not be reached. The originating party 10 or the originating party call control 30 may provide for storing and effecting these options. These options include if a line is busy, for example, sending an instant message to a pager or another mobile phone, etc. Also included is selecting voicemail or multiple voicemails. The service options also include sending an email which may be prestored or selectively input. Another service option includes periodic redialing of the terminating party until communication is achieved. The present invention provides many ways for the originating party to control selection of alternates should the terminating subscriber be unavailable or unreachable by the selected communication mode. In this way communications between the originating party and terminating party may be affected under the control of the originating party.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. An arrangement for retaining call control of a call by an originator comprising;
   a terminating party;
   an originating party for initiating the call including subscriber calling equipment;
   a network for processing the call to the terminating party;
   means for call treatment included in the subscriber calling equipment being operated by the originator in response to an unsuccessful connection of the originating party to the terminating party to subsequently control the call;
   there is further included an originating party call control coupled between the originating party and the network, the originating party call control including call control logic which transmits an indication to the network that control is to be returned to the originating party call control for an unsuccessful connection between the originating party and the terminating party;
   the call control logic initiates the means for call treatment;
   said means for call treatment including within the subscriber calling equipment a call treatment logic and a call treatment rule set;
   said call treatment logic executes at least one set of calling preferences;
   the call treatment rule set stores at least one set of calling preferences for the originating party;
   the at least one set of calling preferences includes at least one of the group of:
      an instant message;
      a voicemail;
      multiple voicemails;
      an email; and
      a periodic retry of the call;
      the instant message further includes:
         a list including a plurality of instant messages; and
         means for selecting at least one of the plurality of instant messages.

2. The arrangement as claimed in claim 1, wherein the means for call treatment is included in an originating party call control.

3. The arrangement as claimed in claim 1, wherein the means for call treatment is included in the originating party.

4. A method for call control of a call by an originator comprising the steps of:
   initiating the call by the originator to a terminating party;
   determining by subscriber calling equipment a call treatment for the call;
   receiving by the originator a status of the terminating party from a network;
   the subscriber calling equipment performs a step of sending the status of the terminating party to the originator, if the call treatment is for originator control;
   there is further included the step of determining by the originator whether call treatment by the originator is required from the status;
   there is further included the steps of:
      selecting from a call treatment rule set an appropriate rule for execution by the originator; and
      executing by the originator the call treatment rule set;
      there are further included the steps of:
         clearing an attempt counter; and
         determining from the attempt counter whether a maximum number of attempts has been achieved;
         if the maximum number of attempts has not been achieved, there are further included the steps of:
            said step of executing by the originator including the step of determining whether the terminating party has been blocked; and
            if the terminating party has been blocked, redialing using an unblocked call identification.

5. The method as claimed in claim 4, wherein if the terminating party is not blocked, there are further included the steps of:
   said step of executing further includes the step of determining whether the terminating party is busy; and
   performing at least one of:
      sending a pre-stored message to a pre-stored phone number; sending a pre-stored message to a pre-stored internet protocol address; and sending a pre-stored message for paging.

6. The method as claimed in claim 5, wherein if the terminating party is not busy, there are further included the steps of:
   determining whether the terminating party has not answered; and
   if the terminating party has not answered, selecting an alternate phone number.

7. The method as claimed in claim 6, wherein there is further included a step of incrementing the attempt counter.

8. The method as claimed in claim 7, wherein there is further included a step of iterating the steps of determining whether the terminating party has been blocked;
   if the terminating party has been blocked, redialing using an unblocked call identification;
   determining whether the terminating party is busy;
   performing at least one of:
      sending a pre-stored message to a pre-stored phone number;
      sending a pre-stored message to a pre-stored internet protocol address; and
      sending a pre-stored message for paging;
   determining whether the terminating party has not answered;
   if the terminating party has not answered, selecting an alternate phone number; and
   incrementing the attempt counter.

* * * * *